(12) United States Patent
Barillari et al.

(10) Patent No.: US 9,195,499 B2
(45) Date of Patent: Nov. 24, 2015

(54) BATCH JOBS USING POSITIONAL SCHEDULING POLICIES OF MOBILE DEVICES

(71) Applicant: International Business Machines Corporation, Armonk, NY (US)

(72) Inventors: Fabio Barillari, Rome (IT); Federica Gari, Rome (IT); Antonio Perrone, Rome (IT)

(73) Assignee: International Business Machines Corporation, Armonk, NY (US)

( * ) Notice: Subject to any disclaimer, the term of this patent is extended or adjusted under 35 U.S.C. 154(b) by 372 days.

(21) Appl. No.: 13/686,183

(22) Filed: Nov. 27, 2012

(65) Prior Publication Data

US 2014/0149987 A1      May 29, 2014

(51) Int. Cl.
*G06F 9/46*      (2006.01)
*G06F 9/48*      (2006.01)

(52) U.S. Cl.
CPC ........ *G06F 9/4843* (2013.01); *G06F 2209/482* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 6,078,826 A | 6/2000 | Croft et al. | |
| 7,685,606 B2 * | 3/2010 | Chang | 719/318 |
| 2003/0120709 A1 * | 6/2003 | Pulsipher et al. | 709/106 |
| 2007/0073808 A1 | 3/2007 | Berrey et al. | |
| 2008/0066070 A1 | 3/2008 | Markov | |
| 2009/0093259 A1 * | 4/2009 | Edge et al. | 455/456.3 |
| 2011/0107341 A1 | 5/2011 | Longobardi et al. | |

FOREIGN PATENT DOCUMENTS

| | | |
|---|---|---|
| JP | 2005535169 A | 11/2005 |
| JP | 2011097145 A | 5/2011 |

OTHER PUBLICATIONS

Bareth, Ulrich et al., "Energy-Efficient Position Tracking in Proactive Location-Based Services for Smartphone Environments", 2011 IEEE 35th Annual Computer Software and Applications Conference (COMPSAC), Jul. 18-22, 2011, pp. 516-521.

(Continued)

*Primary Examiner* — Sisley Kim
(74) *Attorney, Agent, or Firm* — Stephen J. Walder, Jr.; Thomas E. Tyson

(57) ABSTRACT

Mechanisms are provided for executing a batch job associated with a mobile device. A batch job data structure is retrieved that defines a batch job having a plurality of operations to be executed and a scheduling rule having one or more criteria is retrieved. The one or more criteria comprises at least one of a geographical position criteria or a geographical movement criteria for defining a position or path of motion of the mobile device required for initiating execution of the batch job. A determination is made as to whether one of current or predicted future position or path of motion of the mobile device satisfies the criteria of the scheduling rule. In response to the current or predicted future position or path of motion of the mobile device satisfying the criteria of the scheduling rule, execution of the batch job is initiated.

18 Claims, 3 Drawing Sheets

(56) References Cited

OTHER PUBLICATIONS

Gonzalez, Paola A. et al., "Automating Mode Detection Using Neural Networks and Assisted GPS Data Collected Using GPS-Enabled Mobile Phones", Intelligent Transport Systems, IET, vol. 4, Issue 1, Mar. 2010, 12 pages.

Kjaergaard, Mikkel B., "Location-Based Services on Mobile Phones: Minimizing Power Consumption", Pervasive Computing, IEEE, vol. 11, Issue 1, Jan. 2012, pp. 67-73.

* cited by examiner

BATCH JOBS USING POSITIONAL SCHEDULING POLICIES OF MOBILE DEVICES

BACKGROUND

The present application relates generally to an improved data processing apparatus and method and more specifically to mechanisms for performing batch job processing based on positional scheduling policies associated with mobile devices.

Modern mobile/wireless devices, such as smart phones, tablet computers, and the like, combine the functions of a personal digital assistant (PDA) or other computing device able to execute applications, receive user input, perform communications over a digital network, providing portable media players, camera functions, and the like. These mobile/wireless devices typically have high-resolution touchscreen input devices, web browser software that can access and properly display standard web pages rather than only mobile optimized websites, GPS navigation hardware/software, WiFi and mobile broadband access hardware/software, and the like.

A mobile/wireless device executes a mobile operating system such as Apple iOS™ available from Apple Corporation, Microsoft Windows Phone 7™ available from Microsoft Corporation, Nokia Symbian™ from Nokia Corporation, and the like. Such operating systems can be installed on many different models of mobile/wireless devices and can execute third-party applications on these devices. Most recent versions of these mobile operating systems are able to execute multiple applications at the same time in a similar manner as computer operating systems.

SUMMARY

In one illustrative embodiment, a method, in a data processing system, is provided for executing a batch job associated with a mobile device. The method comprises retrieving a batch job data structure defining a batch job having a plurality operations to be executed and retrieving a scheduling rule having one or more criteria. The one or more criteria comprises at least one of a geographical position criteria or a geographical movement criteria for defining a position or path of motion of the mobile device required for initiating execution of the batch job. The method also comprises determining if one of a current or predicted future position or path of motion of the mobile device satisfies the criteria of the scheduling rule. In addition, the method comprises, in response to the current or predicted future position or path of motion of the mobile device satisfying the criteria of the scheduling rule, initiating execution of the batch job.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
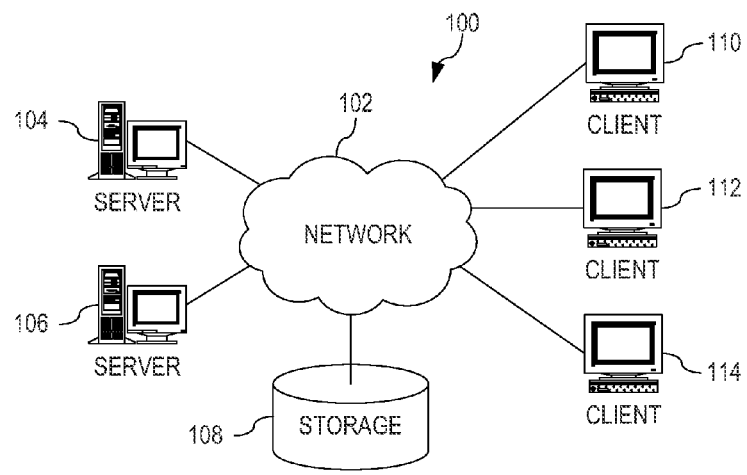
FIG. 1 is an example diagram of a distributed data processing system in which aspects of the illustrative embodiments may be implemented.

The illustrative embodiments provide mechanisms for scheduling batch jobs based on the position and/or movement of a mobile/wireless device and the established positional scheduling policies. As mentioned above, the increase in the capabilities of mobile/wireless devices to rival that of traditional desktop and laptop computing devices has led to the proliferation of mobile/wireless devices in today's society including personal and business implementations. That is, mobile/wireless devices are starting to be used as a substitute for personal computers in many business and personal related activities including accessing electronic mail messages and facsimile transmissions, printing invoices, posting orders and connecting to company intranets, and the like.

The increased demand for new applications on such mobile/wireless devices also requires the presence of system management tools, such as application monitors or batch scheduling services. The illustrative embodiments set forth mechanisms to extend batch scheduling services to not only consider time, calendar, and resource event rules, but also to include geographical position-based rules. These geographical position-based rules may not only be based on instantaneous positional information, but also movement information and predictions of future positions of the mobile/wireless device based on detected position and movement. This permits such batch scheduling to be implemented in mobile/wireless devices based on their current and future positions.

The batch scheduling mechanisms may determine whether conditions/criteria of such geographical position-based rules are met, or will be met at a particular time in the future, and may then execute the batch job(s) corresponding to such geographical position-based rules. These batch job(s) may include performing one or more actions of the same or different types including sending of SMS messages, turning off the mobile/wireless device, downloading/uploading one or more files, executing one or more applications, setting a new configuration of the mobile/wireless devices (such as transferring incoming calls to another device), changing a status of a user profile (e.g., from online to offline or vice versa), changing a ringtone of the mobile/wireless device, initiating a telephone call or other type of communication with another device, or any of a plethora of other actions that may be initiated or performed using the mobile/wireless device.

Thus, with the mechanisms of the illustrative embodiments, batch job processing may be scheduled not only based on time, calendar, and resource based conditions, but also based on the current and/or future position of the device initiating the batch job. In this way, devices that are mobile may be used to initiate such batch job processing when they are in the proper position, or their future position indicates that they will be in the proper position, for such batch job to be initiated. Such position conditions/criteria of scheduled batch jobs may be combined with time, calendar, and resource conditions of such scheduled batch jobs to determine if and when to initiate the batch job on or from the mobile/wireless device.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
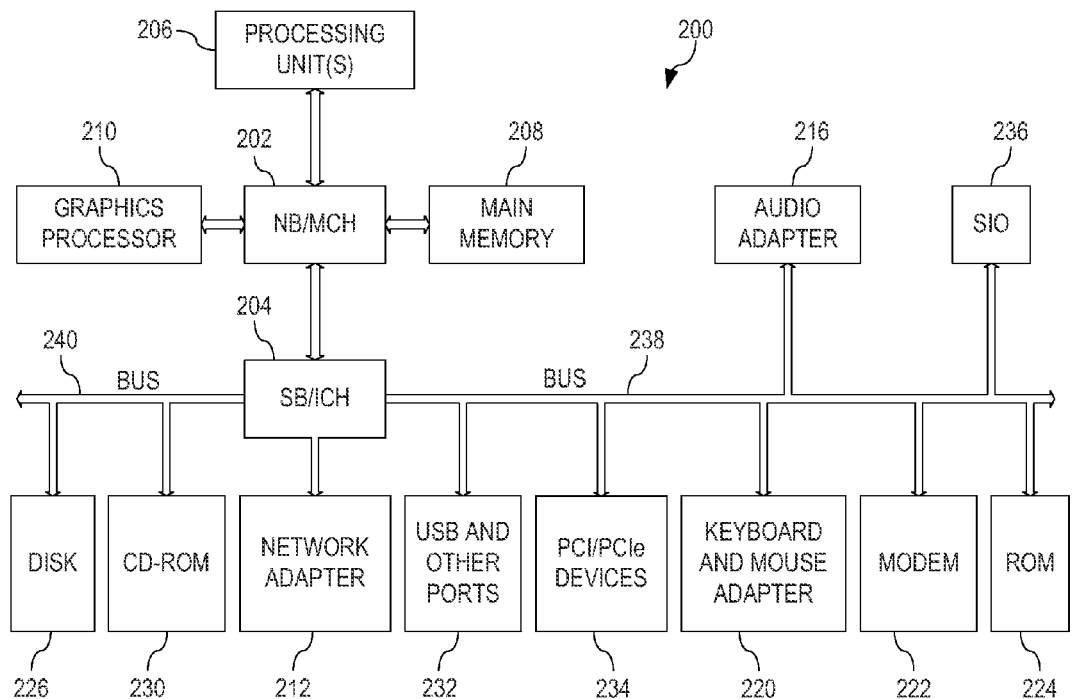
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

With reference again to FIG. 1, the network 102 in FIG. 1 may include one or more wireless communication networks having appropriate infrastructure to facilitate communications of a telephonic and/or data nature between mobile/wireless devices and between mobile/wireless devices and other stationary and/or wired communication and/or computing devices on one or more wire-line telecommunication networks and/or one or more data communication networks. For example, the network 102 may comprise one or more wireless communication networks having base stations, cell towers, and corresponding infrastructure for detecting the presence of mobile/wireless devices within proximity to the infrastructure, routing communications via such infrastructure, and the like. In addition, the network 102 may include one or more traditional landline packet-switched telephone networks, one or more data communication networks, such as the Internet, and facilities for interconnecting these different networks.

One or more of the client computing devices 110-114 may be a mobile/wireless communication device, such as a smart phone, tablet computing device, or the like, which may implement aspects of the illustrative embodiments as described hereafter. That is, the client device 110, for example, may be a smart phone or other mobile/wireless device having logic for scheduling batch jobs based on time, calendar, resource available, and geographical position and/or movement of the client device 110 in accordance with the illustrative embodiments. Alternatively, or in addition, one or more of the server computing devices 104, 106 may comprise logic for implementing aspects of the batch job scheduling for mobile/wireless devices in accordance with the illustrative embodiments as described hereafter.

Figure 3:
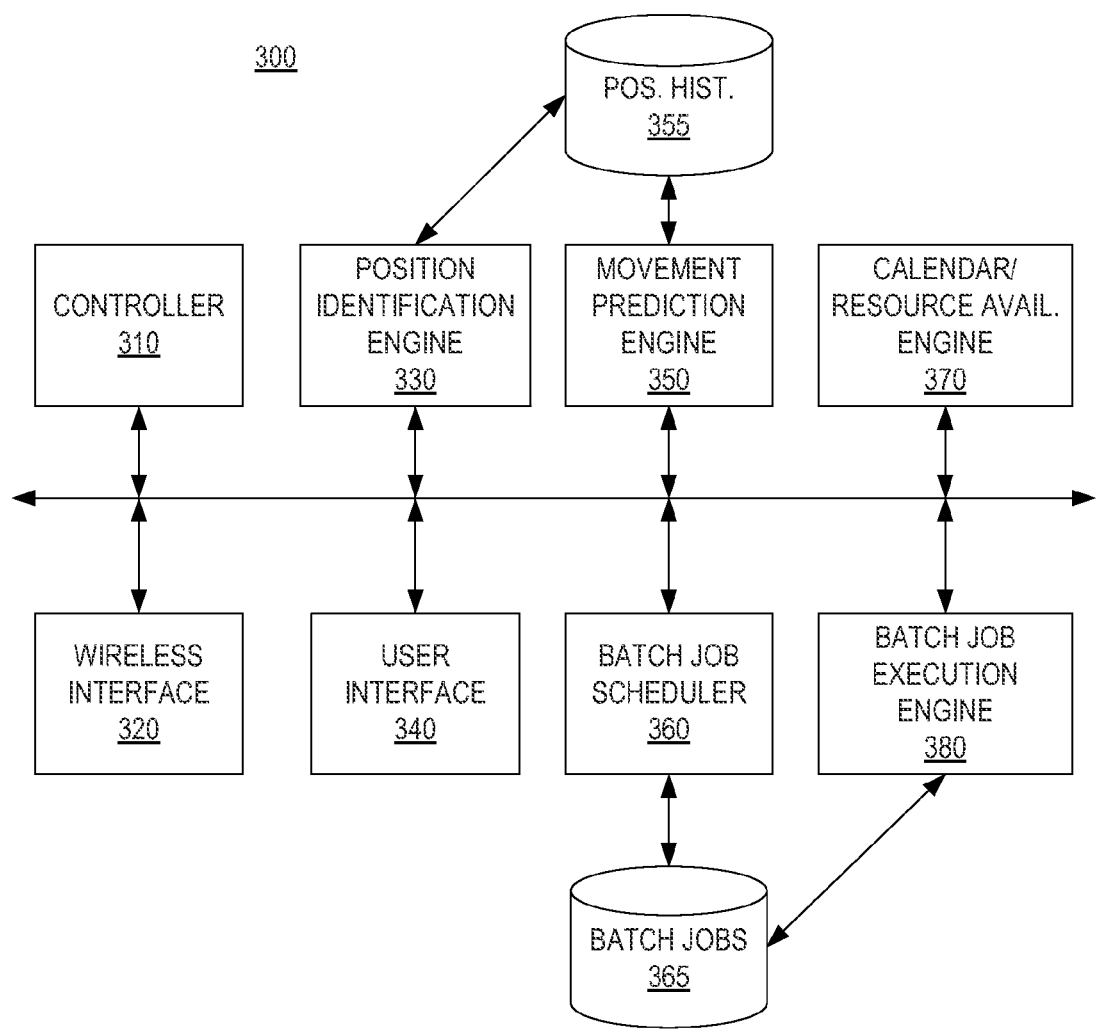
FIG. 3 is an example block diagram of the primary operational elements of a mobile/wireless device in which aspects of the illustrative embodiments may be implemented.

FIG. 3 is an example block diagram of the primary operational elements of a mobile/wireless device in which aspects of the illustrative embodiments may be implemented. The elements shown in FIG. 3 may be implemented in hardware, software, or any combination of hardware and software. In one illustrative embodiment, the elements shown in FIG. 3 are implemented as software loaded into one or more memories of the mobile/wireless device and executed on one or more processors of the mobile/wireless device to cause the mobile/wireless device to perform the operations described hereafter. Storage shown in FIG. 3, such as elements 355 and 365, may be implemented as memories, hard disks, or other physical storage devices capable of storing data for later retrieval.

As shown in FIG. 3, the mobile/wireless device 300, which may be one of the client devices in FIG. 1, for example, comprises a controller 310, a wireless interface 320, a position identification engine 330, a user interface 340, a movement prediction engine 350, a batch job scheduler 360, a calendar/resource availability engine 370, and a batch job execution engine 380. In addition, the mobile/wireless device 300 (hereafter simply referred to as the "mobile device" 300) may store position history data in the position history storage 355 and batch jobs in batch job storage 365. It should be appreciated that FIG. 3 depicts only those elements of the mobile device 300 used to describe the primary operations performed by the illustrative embodiments. A typical mobile device 300 that comprises the mechanisms of the illustrative embodiments will have additional elements not specifically shown in FIG. 3 including other hardware and/or software elements that work separately or in concert with the mechanisms of the illustrative embodiments.

The controller 310 controls the overall operation of the mobile device 300 and orchestrates the operation of the other depicted elements 320-380 and may assist in the management of data stored in the storage devices 355 and 365. The controller 310 may comprise an operating system, device drivers, applications, and other system software, executing on one or more processors, for example. The controller 310 may monitor the operation of the other elements 320-380, send commands to these elements 320-380 to perform certain operations, facilitate communication between elements 320-380, and the like.

The wireless interface 320 provides a communication pathway through which telephone and data communications may be exchanged with one or more networks, such as network 102 in FIG. 1, using any of a number of wireless communication protocols, e.g., 3G, 4G, WiFi, global positioning system (GPS) signaling, or the like. The wireless interface 320 may comprise a transceiver for transmitting and receiving such telecommunications and data, as is generally known in the art.

The position identification engine 330 may comprise a GPS system, cellular triangulation engine, accelerometers, digital map information storage, and/or any other mechanism, or combination of such mechanisms, for determining geographical position information for the mobile device 300. In one illustrative embodiment, the position identification engine 330 comprises a GPS system including geographical map information which is capable of identifying the location or position of the mobile device 300 within a given tolerance of the GPS system, e.g., 10 yards or the like. The geographical position of the mobile device 300 as the user transports the mobile device from one geographical position to another may be stored in the position history information storage 355 for a predetermined period of time so that a historical record of the movement of the mobile device 300 may be discerned from the position history information.

The user interface 340 provides a mechanism through which a user may input data or responses to prompts and through which data and information may be output to the user for consumption by the user. The user interface 340, from a software standpoint, may comprise one or more graphical user interfaces that are displayed to the user via a display device of the mobile device 300, an audio output software, speech recognition software, gesture recognition software, image recognition software, or the like. From a hardware standpoint, the user interface 340 may comprise input devices, such as a keyboard, touchscreen, microphone, camera, or any other input device capable of receiving and recognizing user input. The hardware may further comprise output devices, such as displays, audio output devices, such as speakers via which audio output is presented to the user, or the like.

The movement prediction engine 350 comprises logic for analyzing the position history information stored in the position history storage 355 to predict future positions, and timing of future positions, of the mobile device 300 based on the prior positions and movements of the mobile device 300. Various mechanisms may be used to predict the future position and movement of the mobile device 300. For example, logic may be employed for extrapolating the movements of the mobile device 300, including analyzing speed and trajectory of the mobile device 300, to determine the most probably path, and timing of positions along the path, of the mobile device 300 should the speed and trajectory be continued. More complex analysis may be employed such as analyzing the position and movement of the mobile device 300 and correlating the position and movement of the mobile device 300 with address information in a contacts data structure (not shown) of the mobile device 300, which may store the contact information for persons and organizations with which the user of the mobile device 300 is associated. In addition, or alternatively, recent destination locations may be considered when evaluating the most probably path of motion of the mobile device 300.

The batch job scheduler 360 comprises logic for creating, modifying, deleting, and managing batch jobs and their corresponding scheduling rules for initiating the batch jobs. The batch job scheduler 360 may operate in conjunction with the user interface 340 to provide a mechanism through which a user may specify the particular operations to be performed as part of the batch job and the conditions/criteria that must exist in order to initiate the execution of the batch job. The particular operations to be performed and the corresponding initiation conditions/criteria that are set forth in the scheduling rules may take many different forms depending upon the particular implementation. Examples of such batch job operations and initiation conditions/criteria will be provided hereafter, however these should be considered only examples and not limiting with regard to the implementations of the illustrative embodiments that may be made in view of the present description.

The batch jobs created by the batch job scheduler 360 may be stored in the batch jobs storage 365 for use by batch job execution engine 380 when determining which, if any, of the stored batch jobs should begin execution. A batch job is essentially comprised of a list of a sequence of operations and one or more corresponding scheduling rules defining when execution of the batch of one or more operations is to be initiated. These scheduling rules may specify one or more criteria/conditions that must be met in order for the corresponding batch job operations to be initiated. For example, the criteria/conditions may comprise time criteria, resource availability criteria, current position criteria, detected movement criteria, predicted position criteria, and/or predicted movement criteria. Of course any combination of these various types of criteria, and/or other criteria, may be used without departing from the spirit and scope of the illustrative embodiments.

The batch of operations in the batch job may be ordered or unordered. In an ordered batch job, the operations are performed in a designated ordered sequence. In an unordered batch job, the operations are performed as conditions permit and in any order determined to be appropriate under the circumstances. Thus, for example, if current conditions do not permit a first operation to be performed immediately upon initiating the batch job processing of an unordered batch job, then execution of other operations in the batch job may be initiated while waiting for conditions to be appropriate for the execution of the first operation. In an ordered batch job, however, the other operations in the batch job would not be permitted to execute ahead of the first operation and all of the operations must wait until conditions are appropriate for performing the first operation in the batch job.

The operations in the batch job may take many different forms including initiating the execution of applications, initiating the execution of operations within already running applications, transmitting a communication to another device, e.g., another mobile device, server, telecommunications device, or the like, via one or more networks, retrieving content from a remote device, executing an operation within the controller, e.g., turning on/off the mobile device 300, reducing power consumption by adjusting settings of the mobile device 300, outputting a message to the user of the mobile device 300, or any of a plethora of other operations that may be performed by the mobile device 300 or a remotely located device.

As mentioned above, the batch job may comprise a plurality of such operations that are executed in response to the conditions/criteria of the scheduling rule associated with the batch job being met. For example, the operations may comprise outputting a message to the user of the mobile device 300, initiating a application to retrieve electronic mail messages from a remote electronic mail server, and changing settings of the mobile device 300 so that incoming telephone calls are redirected to another telephone device in a nearby location.

The scheduling rules may take many different forms but, in accordance with the illustrative embodiments, include conditions/criteria concerning current and/or future position or movement of the mobile device 300. For example, the scheduling rules may be of the type:

I am in/out of a specified geographical area;
I am going to a specified geographical area;
I am coming from a specified geographical area;
Based on my current position and predicted movement, I will be late arriving at a specified geographical location;
I have followed a specific path of geographical locations;
I will be arriving early at a specified geographical location;
I have stayed in the same geographical location for longer than a specified period of time;
I am moving too slowly to arrive at a specified geographical location within a specified time period;
I am moving too fast and will arrive at the specified geographical location more than a predetermined number of minutes before a scheduled time; Etc.

The wide variety of the particular conditions/criteria that may be specified in a scheduling rule are too numerous to set forth herein but may generally include timing, calendar, resource availability, event occurrence, current/future position, and/or current/future movement conditions/criteria. For example, the scheduling rules may comprise any combination of date/time conditions (e.g., the batch job is initiated at a given date/time), period conditions (e.g., yearly, monthly, weekly, daily, hourly, upon reboot), resource and/or local event conditions (e.g., the batch job is initiated if a local event occurs), point and radius condition (e.g., the batch job is initiated if the current/future position of the device is/will be within an area of a circle around a specified geographical location), polygonal conditions (e.g., the batch job is initiated if the current/future position of the device is/will be within the area of a specified polygon), current/future movement conditions (e.g., moving too fast, moving too slow, etc. for a scheduled event set forth in the calendar).

The batch job execution engine 380, which may execute as a background application, for example, may evaluate the conditions/criteria of the scheduling rules associated with defined batch jobs in the batch job storage 365 to determine if any of the batch jobs should be initiated. As part of this determination, the batch job execution engine 380 may further determine if the batch job has been initiated previously within a predetermined time period to avoid the batch job being initiated multiple times in succession within a short period of time. If the batch job has already been executed within the predetermined period of time, execution of the batch job may be suspended until after the predetermined period of time has expired.

The evaluation of the conditions/criteria of the batch job scheduling rules may be based on information obtained from the position identification engine 330 regarding the current geographical position of the mobile device 300 and the movement prediction engine 350 regarding the predicted future positions, timing of these future positions, and predicted movement of the mobile device 300. Moreover, the batch job execution engine 380 may further utilize information obtained from the calendar/resource availability engine 370 to determine if conditions/criteria of batch job scheduling rules are satisfied. The calendar/resource availability engine 370 may use various mechanisms for obtaining the variety of calendar/resource availability information including APIs, agent applications, transmission of interrogation signals to another device, or the like.

The calendar/resource availability information obtained from the calendar/resource availability engine 370 may be used to determine if a batch job whose current/future geographical position and/or movement criteria are met can actually be performed based on calendar scheduling and resource availability. For example, batch jobs that have scheduling criteria concerned with particular dates/times may have these criteria evaluated against information stored in an electronic calendar data structure accessible by the calendar/resource availability engine 370. Moreover, current conditions of resources of the mobile device 300, e.g., battery power remaining, memory remaining, available storage, wireless connection condition, whether the mobile device is in a WiFi hotspot or communicating via a cellular network, e.g., 3G or 4G network, and other resource availability and current conditions may be obtained by the calendar/resource available engine 370 and provided for use by the batch job execution engine 380 in determining whether batch job scheduling rule criteria/conditions are met so that a batch job may be initiated.

To further illustrate this feature, consider a situation in which a batch job has been created and stored in the batch job storage 365 via the batch job scheduler 360 by a user using the user interface 340, and the batch job has a scheduling rule that has the condition that the batch job is initiated in response to the position of the mobile device 300 being outside of a 5 mile radius of the geographical location of the user's office, or a movement path or predicted future position of the mobile device 300 indicates that the mobile device 300 will be within the 5 mile radius of the user's office geographical location within a 5 minute time frame. An additional condition of the scheduling rule may be that the user's mobile device 300 have sufficient storage space (e.g., 1 MB) available to perform the batch job operations which may be, for example, to download the user's electronic mail from the office mail server and retrieve the user's voicemail messages remotely from a voice-over-IP (VOIP) server. Moreover, yet an additional scheduling rule may be that the batch job only be executed if it has not previously been executed within the last 15 minutes.

With such a scenario, the current/future position and movement information may be obtained from the position identification engine 330 and movement prediction engine 350, respectively. The movement prediction engine 350 may predict the future positions of the mobile device 300 as well as the movement path and timing of the positions based on the position history information obtained from position history storage 355. If the current position information indicates that the mobile device 300 is outside of the 5 mile radius of the user's office location, then this condition is satisfied and the batch job should initiate barring any other condition indicating non-execution of the batch job. If the current position information indicates that the mobile device 300 is still within the 5 mile radius, then the predicted future position, movement, and timing may be analyzed to determine if the mobile device 300 is predicted to be positioned or move out of the 5 mile radius within the next 5 minutes. If so, then again the batch job should be initiated barring any other condition indicating non-execution of the batch job. If not, then both conditions fail and the batch job is not executed.

Assuming that one of the current/future position or movement conditions are met above, the batch job execution engine 380 may further check the other conditions to determine if any condition indicates non-execution of the batch job. That is, the calendar/resource availability engine 370 may gather the current available storage information from the mobile device 300 memory/storage systems and provide it to the batch job execution engine 380. The batch job execution engine 380 may determine whether the current available storage information indicates that at least 1 MB of storage is available. If not, then the batch job may not be executed and a notice may be output to the user via a display or other output device of the mobile device 300. If the current storage availability is 1 MB or more, then the batch job again should be executed barring any other conditions indicating non-execution of the batch job.

Assuming that the above conditions have been met, the timing condition can be evaluated to determine if the batch job has been previously executed within 15 minutes of the current time. The batch job execution engine 380 may store a log of which batch jobs have been executed and when (i.e. having a timestamp associated with the log entry). Based on this information, it can be determined whether the batch job has been executed within 15 minutes of the current time and if so, not executing the batch job.

It should be noted that while the above description assumes a particular ordering of the checks of the conditions of a scheduling rule, such an ordering is not required. To the contrary, any ordering of the checks, or even simultaneous checking of the conditions/criteria of a scheduling rule may be used without departing from the spirit and scope of the illustrative embodiments. For example, a first check may be to check the timing condition and only if the timing condition is satisfied are the other checks performed. Similarly, the resource availability check could be performed prior to the geographical position/movement conditions.

An additional functionality of the mechanism of the illustrative embodiments is that the batch job execution engine 380 may be placed in a sleep mode and may only operate on a periodic or scheduled manner. That is, the batch job execution engine 380 may be in a sleep mode, thereby minimizing resource usage of the batch job execution engine 380, and may be awoken by the controller 310 at periodic intervals, e.g., every 5 minutes. In an alternative embodiment, the batch job execution engine 380 may determine, from analysis of the batch jobs in the batch job storage 365 using the current/future position/movement information obtained from position identification engine 330 and movement prediction engine 350, as well as calendar/resource availability information from the calendar/resource availability engine 370, which of the batch jobs are likely to have their conditions/criteria met next in time. This may be determined, for example, by evaluating a difference in the current status of the mobile device 300 position/movement/scheduled events/resource availability, and the batch job scheduling rule conditions/criteria. The batch job whose scheduling rule has the lowest overall difference between current status of the mobile device 300 and the rule's conditions/criteria may be selected as the next batch job that is likely to be executed. Based on this selection, a prediction as to when the current status of the mobile device 300 is likely to meet the conditions/criteria of the batch job scheduling rule and this predicted wake-up time setting may be communicated to the controller 310. The batch job execution engine 380 may then be placed in the sleep mode (low power/resource consumption mode) and may then be awoken when the controller 310 determines that the current time matches (within a given tolerance) the predicted wake-up time setting of the batch job execution engine 380.

It should be appreciated that while FIG. 3 illustrates all of elements 320-380 being located within the mobile device 300, the illustrative embodiments are not limited to such. To the contrary, one or more of the elements 320-380 may be provided by a server computing device, such as server 104, 106 in FIG. 1, with which the mobile device 300 may communicate via one or more networks, such as network 102 in FIG. 1, to obtain the services of the server 104, 106 to perform the operations outlined above for that element.

For example, one or more of the batch job scheduler 360, the batch job execution engine 380, or batch job storage 365 may be provided on a remotely located server. The user of the mobile device 300 may interface with the batch job scheduler 360 on a remote server via the user interface 340 and wireless interface 320 to perform the functions of creating, modifying, deleting, or otherwise managing batch jobs stored in the batch job storage 365 which are associated with the mobile device 300. The batch job execution engine 380 may execute on a remote server and may communicate with the mobile device 300 via the wireless interface 320 to obtain current/predicted position/movement information as well as calendar/resource availability information from the calendar/resource availability engine 370 so that the batch job execution engine 380 may determine whether batch jobs should be initiated in the manner previously discussed. Of course, other embodiments may have the position identification engine 330, movement prediction engine 350, and position history storage 355 located remote from the mobile device 300 but in communication with the mobile device 300, or with another system tracking the movement of the mobile device 300, to obtain the necessary position information for predicting future positions and movement of the mobile device 300. Other embodiments may make use of different configurations in which different elements are provided on the remote servers and the mobile device 300 based on the particular preferences for the implementation.

Thus, the illustrative embodiments provide mechanisms for initiating batch job processing based not only upon time, calendar, and resource availability information, but also based upon current/future position/movement information for a mobile device. The mechanisms of the illustrative embodiments with regard to determining whether to initiate an established batch job can be performed as a background application (not readily discernible to the user of the mobile device) and may be kept in a low resource consumption mode until needed to check whether a batch job is to be initiated, e.g., on a periodic basis or at a predicted time of a next likely batch job to execute. Hence, the illustrative embodiments allow mobile devices to initiate batch job processing only when they are in the correct geographical position, will be in the correct geographical position, or have followed a specific path of motion to satisfy the requirements for initiating the batch job.

Figure 4:
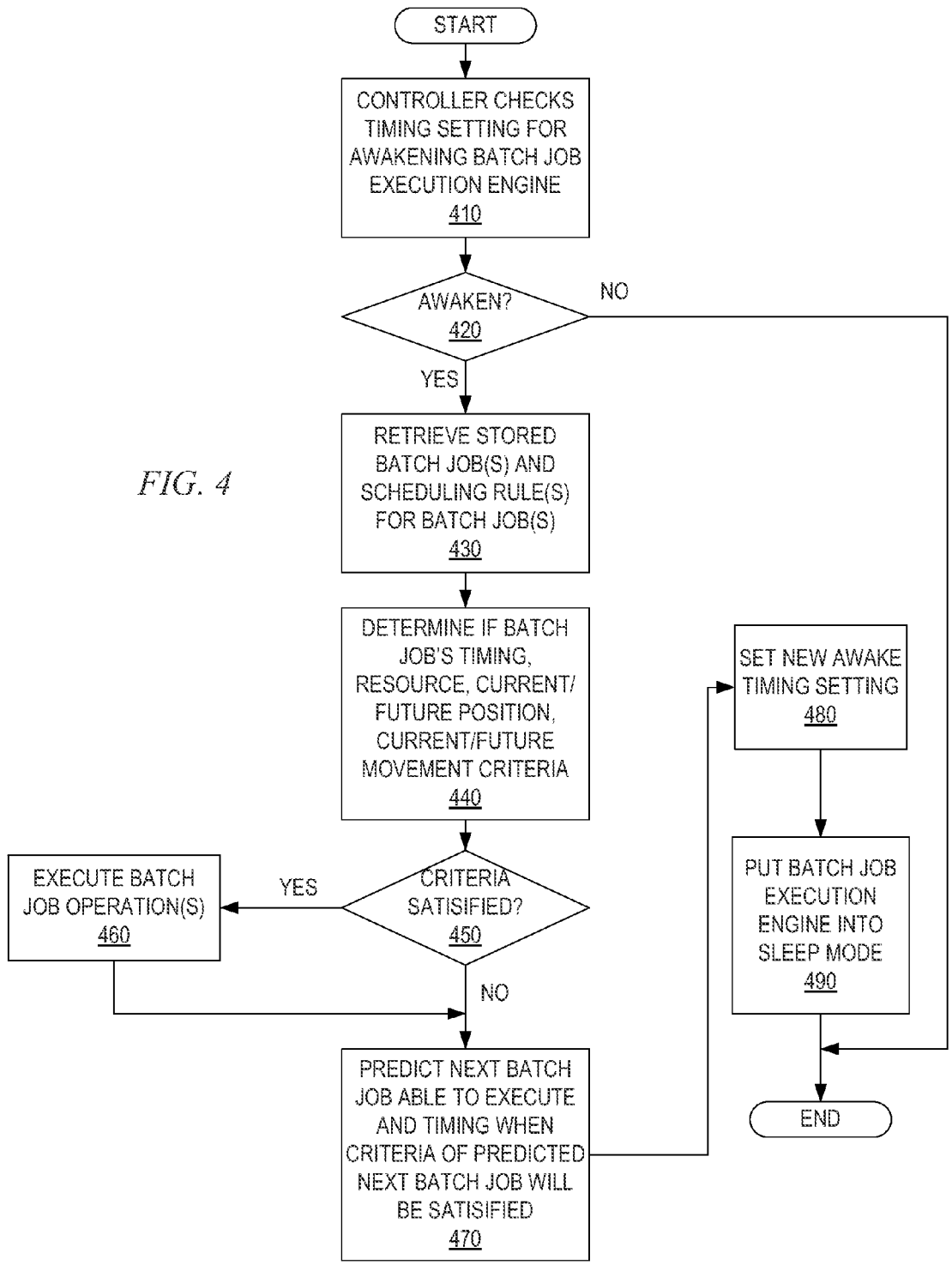
FIG. 4 is a flowchart outlining an example operation of a mobile device batch job execution mechanism in accordance with one illustrative embodiment.

FIG. 4 is a flowchart outlining an example operation of a mobile device batch job execution mechanism in accordance with one illustrative embodiment. As shown in FIG. 4, the operation starts by having a controller check a timing setting for awakening the batch job execution engine (step 410). A determination is made as to whether the batch job execution engine should be awaken or not (step 420). If not, the operation ends and will be repeated by the controller periodically. If the batch job execution engine should be awaken according to the timing setting, then the batch job execution engine is awakened and retrieves the batch jobs and their corresponding scheduling rules having criteria for defining when the batch jobs should be executed (step 430).

Determinations are made as to whether the criteria of one or more of the scheduling rules for one or more of the batch jobs have been satisfied (step 440). If such criteria have been satisfied (step 450), then the corresponding batch job operations are executed (step 460). If the criteria has not be satisfied, then the batch job is not executed. In either case, the batch job execution engine may predict the next batch job able to execute and the timing of when the scheduling rule criteria for this next batch job will be satisfied (step 470). This timing may then be used to set the new awake timing setting for awakening the batch job execution engine (step 480). The batch job execution engine is then placed into a sleep mode (step 490) and the operation terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for executing a batch job associated with a mobile device, comprising:
retrieving, by the data processing system, a batch job data structure defining a batch job having a plurality of operations to be executed, wherein the batch job is specific and customized for the mobile device or a user of the mobile device;

retrieving, by the data processing system, a scheduling rule having one or more criteria, wherein the one or more criteria comprises at least one of a geographical position criteria or a geographical movement criteria for defining a position or path of motion of the mobile device required for initiating execution of the batch job;

determining, by the data processing system, if one of a current or predicted future position or path of motion of the mobile device satisfies the criteria of the scheduling rule; and in response to the current or predicted future position or path of motion of the mobile device satisfying the criteria of the scheduling rule, initiating execution of the batch job by the data processing system, and wherein the method further comprises, in response to one of a current or predicted future position or path of motion of the mobile device not satisfying the criteria of the scheduling rule:

predicting, by the data processing system, which batch job data structures, in a plurality of batch job data structures, will have criteria of their corresponding scheduling rules met at a future time;

determining, by the data processing system, based on the prediction, a next batch job that is associated with a batch job data structure, in the plurality of batch job data structures, that is to be next executed by the data processing system at a next future time;

setting a new awake timing setting for awakening the batch job scheduling engine;

placing, by the data processing system, the batch job scheduling engine into a sleep mode of operation until the next future time; and awakening, by the data processing system, the batch job scheduling engine in response to a current time being equal to or later than the next future time.

2. The method of claim 1, wherein determining if one of a current or predicted future position or path of motion of the mobile device satisfies the criteria of the scheduling rule comprises:

predicting one or more future positions and a timing of the one or more future positions of the mobile device based on previously stored position information; and comparing the one or more predicted future positions and timing of the one or more future positions with the one or more criteria of the scheduling rule.

3. The method of claim 2, wherein predicting one or more future positions and timing of the one or more future positions comprises determining a speed and path of motion of the mobile device based on the previously stored position information, and determining a destination location based on the speed, path of motion, and recent destination location information.

4. The method of claim 1, wherein the one or more criteria further comprises at least one of a time criteria, a calendar criteria, and a resource availability criteria.

5. The method of claim 1, wherein the one or more criteria further comprises at least one of time period conditions specifying a repeating period of time at which the batch job is to be executed, a point-and-radius condition specifying a geographic point and a geographic radius about the geographic point defining a region such that in response to the mobile device entering the region, execution of the batch job is initiated, a polygonal geographical region condition defining a polygonal region such that in response to the mobile device entering the polygonal region, execution of the batch job is initiated.

6. The method of claim 1, wherein determining, by the data processing system, if one of a current or predicted future position or path of motion of the mobile device satisfies the criteria of the scheduling rule comprises determining if the mobile device is predicted to be within a geographical region specified by the criteria of the scheduling rule at a future time corresponding to a time criteria specified by the criteria of the scheduling rule, and determining that particular resources specified in the criteria of the scheduling rule are predicted to be available at the future time.

7. The method of claim 1, wherein the data processing system is the mobile device.

8. The method of claim 1, wherein the one or more criteria further comprises a resource availability criterion specifying a required availability of a specified resource that must be available when the mobile device is at a geographic location corresponding to the geographical position criteria or geographical movement criteria in order for execution of the batch job to be initiated.

9. The method of claim 1, wherein the specified resource is one of a memory space available on the mobile device, battery power of a battery of the mobile device, available storage space on the mobile device, or presence of the mobile device in a WiFi hotspot.

10. A computer program product comprising a non-transitory computer readable medium having a computer readable program stored therein, wherein the computer readable program, when executed on a computing device, causes the computing device to:

retrieve a batch job data structure defining a batch job having a plurality of operations to be executed, wherein the batch job is specific and customized for the mobile device or a user of the mobile device;

retrieve a scheduling rule having one or more criteria, wherein the one or more criteria comprises at least one of a geographical position criteria or a geographical movement criteria for defining a position or path of motion of a mobile device required for initiating execution of the batch job;

determine if one of a current or predicted future position or path of motion of the mobile device satisfies the criteria of the scheduling rule; and initiate, in response to the current or predicted future position or path of motion of the mobile device satisfying the criteria of the scheduling rule, execution of the batch job by the computing device, and wherein the computer readable program comprises, in response to one of a current or predicted future position or path of motion of the mobile device not satisfying the criteria of the scheduling rule:

predict, by the data processing system, which batch job data structures, in a plurality of batch job data structures, will have criteria of their corresponding scheduling rules met at a future time;

determine, by the data processing system, based on the prediction, a next batch job that is associated with a batch job data structure, in the plurality of batch job data structures, that is to be next executed by the data processing system at a next future time;

set a new awake timing setting for awakening the batch job scheduling engine;

place, by the data processing system, the batch job scheduling engine into a sleep mode of operation until the next future time; and awaken, by the data processing system, the batch job scheduling engine in response to a current time being equal to or later than the next future time.

11. The computer program product of claim 10, wherein determining if one of a current or predicted future position or path of motion of the mobile device satisfies the criteria of the scheduling rule comprises:
predicting one or more future positions and a timing of the one or more future positions of the mobile device based on previously stored position information; and
comparing the one or more predicted future positions and timing of the one or more future positions with the one or more criteria of the scheduling rule.

12. The computer program product of claim 11, wherein predicting one or more future positions and timing of the one or more future positions comprises determining a speed and path of motion of the mobile device based on the previously stored position information, and determining a destination location based on the speed, path of motion, and recent destination location information.

13. The computer program product of claim 10, wherein the one or more criteria further comprises at least one of a time criteria, a calendar criteria, and a resource availability criteria.

14. The computer program product of claim 10, wherein the one or more criteria further comprises at least one of time period conditions specifying a repeating period of time at which the batch job is to be executed, a point-and-radius condition specifying a geographic point and a geographic radius about the geographic point defining a region such that in response to the mobile device entering the region, execution of the batch job is initiated, a polygonal geographical region condition defining a polygonal region such that in response to the mobile device entering the polygonal region, execution of the batch job is initiated.

15. The computer program product of claim 10, wherein determining if one of a current or predicted future position or path of motion of the mobile device satisfies the criteria of the scheduling rule comprises determining if the mobile device is predicted to be within a geographical region specified by the criteria of the scheduling rule at a future time corresponding to a time criteria specified by the criteria of the scheduling rule, and determining that particular resources specified in the criteria of the scheduling rule are predicted to be available at the future time.

16. The computer program product of claim 10, wherein the computing device is the mobile device.

17. The computer program product of claim 10, wherein the one or more criteria further comprises a resource availability criterion specifying a required availability of a specified resource that must be available when the mobile device is at a geographic location corresponding to the geographical position criteria or geographical movement criteria in order for execution of the batch job to be initiated.

18. An apparatus, comprising:
a processor; and
a memory coupled to the processor, wherein the memory comprises instructions which, when executed by the processor, cause the processor to:
retrieve a batch job data structure defining a batch job having a plurality of operations to be executed, wherein the batch job is specific and customized for the mobile device or a user of the mobile device;
retrieve a scheduling rule having one or more criteria, wherein the one or more criteria comprises at least one of a geographical position criteria or a geographical movement criteria for defining a position or path of motion of a mobile device required for initiating execution of the batch job;
determine if one of a current or predicted future position or path of motion of the mobile device satisfies the criteria of the scheduling rule; and
initiate, in response to the current or predicted future position or path of motion of the mobile device satisfying the criteria of the scheduling rule, execution of the batch job by the computing device, and wherein the apparatus comprises, in response to one of a current or predicted future position or path of motion of the mobile device not satisfying the criteria of the scheduling rule:
predict, by the data processing system, which batch job data structures, in a plurality of batch job data structures, will have criteria of their corresponding scheduling rules met at a future time;
determine, by the data processing system, based on the prediction, a next batch job that is associated with a batch job data structure, in the plurality of batch job data structures, that is to be next executed by the data processing system at a next future time;
set a new awake timing setting for awakening the batch job scheduling engine;
place, by the data processing system, the batch job scheduling engine into a sleep mode of operation until the next future time; and
awaken, by the data processing system, the batch job scheduling engine in response to a current time being equal to or later than the next future time.

* * * * *